United States Patent [19]

Fecik et al.

[11] Patent Number: 4,556,407
[45] Date of Patent: Dec. 3, 1985

[54] TEMPERING RING WITH PIVOTING GLASS SHEET SUPPORT MEMBER

[75] Inventors: Michael T. Fecik, Pittsburgh; Robert G. Frank, Franklin Township, Westmoreland County; John J. Ewing, Tarentum; Andrew C. Siminerio, Pittsburgh, all of Pa.

[73] Assignee: PPG Industries, Inc., Pittsburgh, Pa.

[21] Appl. No.: 637,102

[22] Filed: Aug. 2, 1984

[51] Int. Cl.⁴ .............................................. C03B 23/02
[52] U.S. Cl. ...................................... 65/289; 65/273; 65/291
[58] Field of Search ................. 65/289, 290, 291, 273, 65/348

[56] References Cited

U.S. PATENT DOCUMENTS

| | | |
|---|---|---|
| 3,089,319 | 5/1963 | Carson et al. .......................... 65/288 |
| 3,163,514 | 12/1964 | Golightly ............................... 65/288 |
| 3,168,391 | 2/1965 | Malobicky et al. ................... 65/107 |
| 3,741,743 | 6/1973 | Seymour ............................... 65/287 |
| 3,846,104 | 11/1974 | Seymour ............................... 65/104 |
| 3,973,943 | 8/1976 | Seymour ............................... 65/348 |

FOREIGN PATENT DOCUMENTS

| | | |
|---|---|---|
| 222422 | 10/1958 | Australia ............................. 65/290 |
| 1089973 | 6/1955 | France ................................. 65/291 |

*Primary Examiner*—Arthur Kellogg
*Attorney, Agent, or Firm*—Andrew C. Siminerio

[57] ABSTRACT

A tempering ring for supporting a hot shaped glass sheet during tempering has inner and outer rings conforming in shape and outline to that of the hot glass sheet. Individual glass sheet support members with pivoting head members are mounted around the perimeter of the tempering ring. The head members pivot to conform to the peripheral contours of the hot shaped glass sheet. The glass sheet support members are each adjusted in both a longitudinal and vertical direction.

17 Claims, 11 Drawing Figures

U.S. Patent   Dec. 3, 1985   Sheet 1 of 2   4,556,407
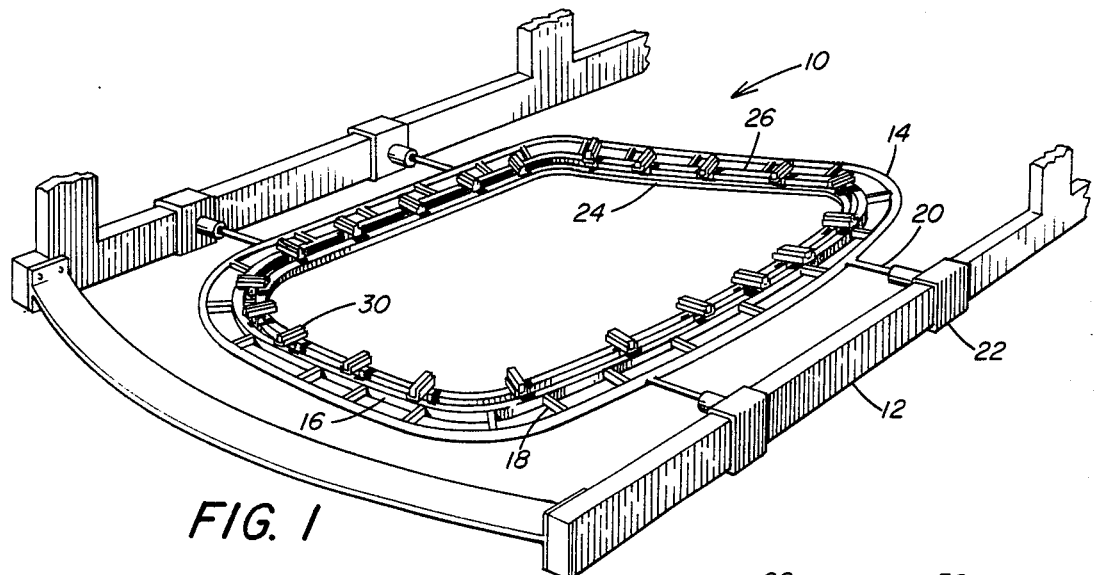
FIG. 1
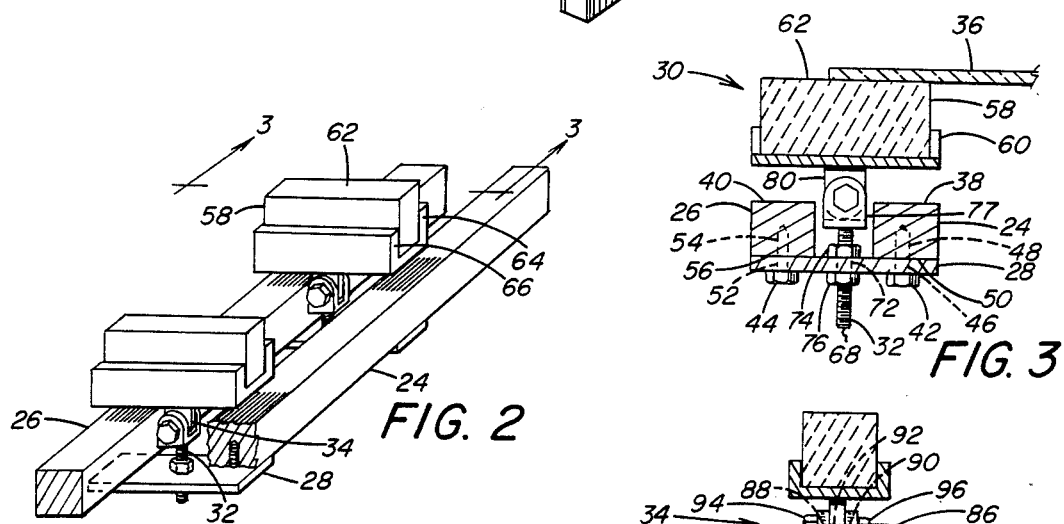
FIG. 2
FIG. 3
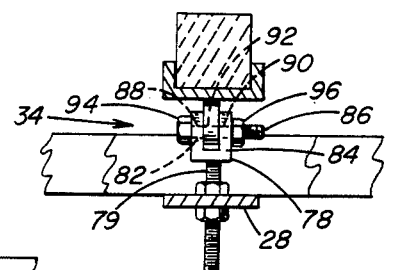
FIG. 4
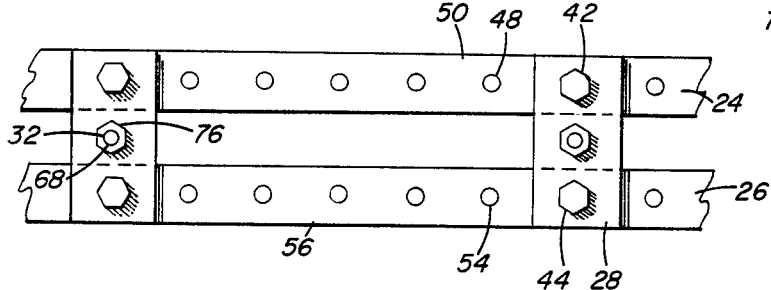
FIG. 5

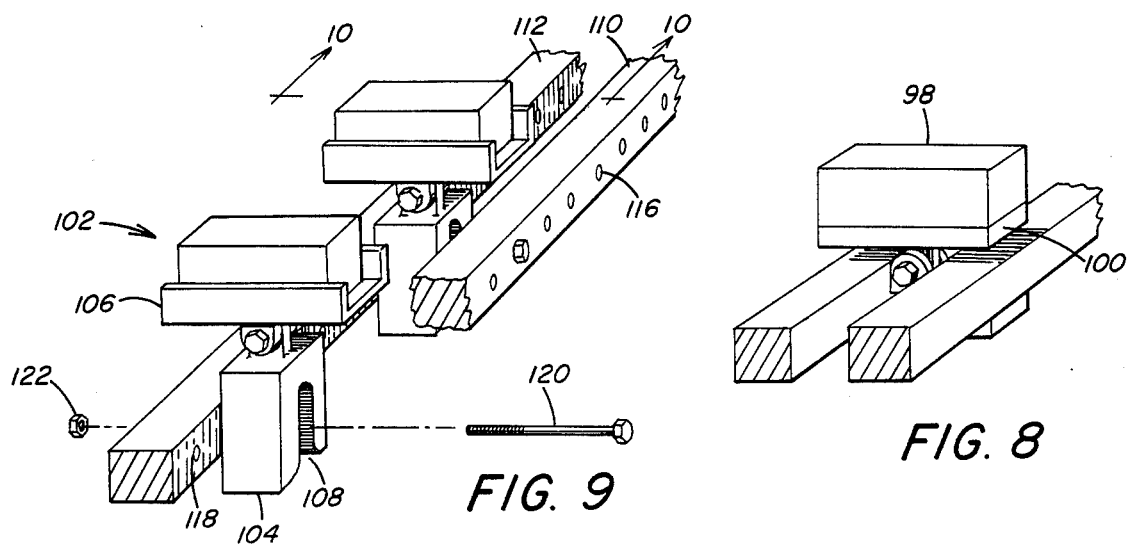
FIG. 9
FIG. 8
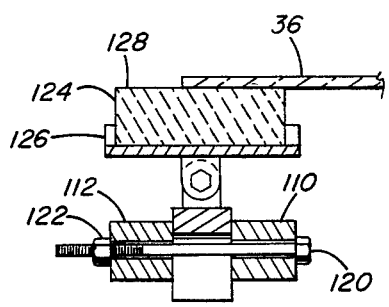
FIG. 10
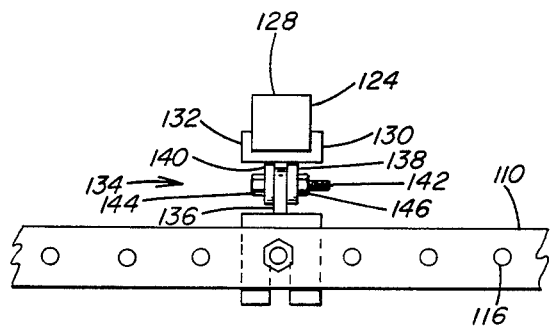
FIG. 11
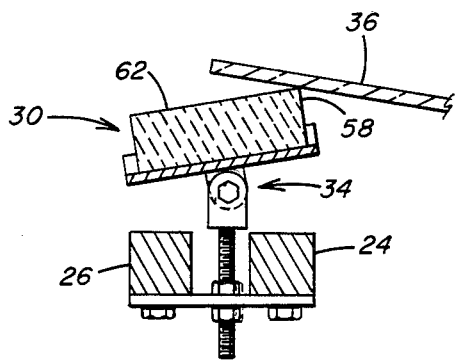
FIG. 6
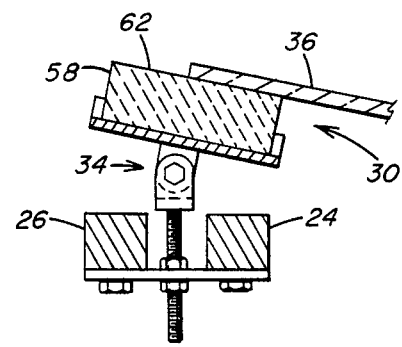
FIG. 7

TEMPERING RING WITH PIVOTING GLASS SHEET SUPPORT MEMBER

BACKGROUND OF THE INVENTION

1. Related Application:

This application is related to application U.S. Ser. No. 637,103 filed even date entitled "DUAL Ring Segmented Block Tempering Ring."

2. Field of the Invention:

This invention relates to a tempering ring for supporting glass sheets and more specifically to a tempering ring that supports a hot shaped glass sheet on individually adjustable glass sheet support members that have pivoting head sections that conform to the peripheral contours of the glass sheet at its edge.

3. Brief Description of the Presently Available Technology:

The following patents relate to the handling of hot shaped glass sheets. Although some deal with glass bending techniques in general and others with tempering rings, all present apparatuses that support hot shaped glass sheets.

U.S. Pat. No. 3,163,514 to Golightly and U.S. Pat. No. 3,168,391 to Malobicky and Barch teach the use of dual rails on a skeletonized mold for a glass bending apparatus. The inner metal rail is notched and its top surface rail is disposed higher than that of the outer metal rail so that the glass sheet is supported directly and entirely by the inner rail.

U.S. Pat. No. 3,089,319 to Carson and White teaches a glass bending apparatus that includes a dual rail frame having a nonmetallic inner rail, such as Marinite or graphite, that will not fuse with the glass sheet during bending. Pivoting fingers support the flat glass sheet as it is lowering into the glass bending apparatus and shaped. When shaping is complete the fingers are no longer in contact with the glass sheet. As in the previously discussed patents, the rails are continuous except at the mold bend points.

U.S. Pat. No. 3,741,743 to Seymour teaches a shaping frame for both shaping and tempering operations. Dual steel rails support the glass sheet at its perimeter and are bridged by layers of steel mesh. The mesh must be sized so that it is strong enough to bridge the gap between the rails and support the glass sheet and open enough to allow adequate air circulation during tempering. The mesh is secured to the dual rail with wire elements.

U.S. Pat. No. 3,846,104 to Seymour teaches a shaping mold and a tempering ring. The lower outlining shaping mold is a stainless steel ring with a T-shaped cross section. The upper surface of the T-shaped ring is bonded to a refractory facing so as not to mar the heat softened glass during the shaping operation. The head section of the T member is continuous in the direction of the length of the rail. The tempering ring includes a single stainless steel rail with notched edges for direct support of the glass during tempering and with holes through it to increase air flow circulation.

U.S. Pat. No. 3,973,943 to Seymour teaches that the use of metal rails to contact a shaped glass sheet during a tempering operation has drawbacks. The difference in the cooling rates between the glass sheet and metal support sets up a retarded cooling rate at the glass to metal interface. This difference between the glass sheet cooling rate and the retarded cooling rate where the glass sheet rests directly on the rail (or rail section if it is notched) results in surface tensions in the glass which may cause breakage. To minimize or eliminate this problem, Seymour teaches a composite rail member including two side-by-side continuous rails with no spacing between them. The inner rail is a nonmetallic material having a lower heat transfer coefficient than the rigid steel outer rail to which it is mounted against. The upper edge of the inner rail is disposed above the upper edge of the outer steel rail so that only the inner rail contacts the shaped glass sheet.

All the discussed patents work adequately in normal shaping and tempering operations. A common problem associated with the support rings or rails of each patent is the need to have the edge of the tempering ring that supports the hot shaped glass sheet conform with the contours of the glass sheet as close as possible to provide a glass sheet support having a desired shape. This requires precise machining of glass support ring sections. It would be advantageous to have a tempering ring that supports the glass sheet with easily replaceable individual glass sheet support members that can be adjusted both longitudinally and vertically for fine adjustment to conform with the glass sheet contours thus minimizing if not eliminating any machining of the glass sheet support members. In addition, it would be beneficial if portions of the glass sheet support member could pivot so that when initially contacting the peripheral region of the glass sheet, they could rotate and assume the contour of the edge.

As used herein, "longitudinal" adjustment means movement along a support rail or rails about the central axis of the tempering ring. As used herein, "vertical" adjustment means up and down movement relative to the upper surface of a support rail or rails.

SUMMARY OF THE INVENTION

This invention provides an apparatus for supporting a hot shaped glass sheet of given shape and outline during thermal treatment. A support rail includes inner and outer rings. The inner ring is located a short distance inboard of the periphery of the glass sheet. The outer ring encircles the inner ring and is a short distance outboard of the periphery of the glass sheet. The inner and outer rings are aligned with each other and each has an upper edge surface which conforms in outline and vertical contour to the shape of the glass sheet. Spacing facilities, in the form of hold-down plates that can be located at a number of positions around the perimeter of the rings, interconnect and maintain the rings in a predetermined spaced relationship. A plurality of discrete glass sheet support members are individually mounted around the ring. Each glass sheet support member has a glass sheet supporting surface and facilities to allow the surface to pivot and be vertically adjusted so that the glass sheet support surfaces define a peripheral contour similar to that of the hot shaped glass sheet to be supported thereon.

Another embodiment of this invention provides glass sheet support members having a spacer member and a pivoting head member. The glass sheet support members are distributed around the perimeter of the rings with the spacer members maintaining the spacing between the inner and outer rings. The glass sheet support members are mounted and retained at a given position on the perimeter of the rings by an adjusting bolt passing through one of a set of adjusting bolt holes in the rings and an opening in the spacer member. An adjusting bolt nut is used to secure the adjusting bolt in place.

A series of the sets of adjusting bolt holes along the perimeter of the rings allows the glass sheet support member to be longitudinally adjusted and mounted at any adjusting bolt holes location. The opening in the spacer member is slot-shaped along the vertical direction of the spacer member so that the glass sheet support member can be adjusted vertically. The pivoting head members are in spaced relation above the rings and pivotally connected to the spacer means to support the hot shaped glass sheet and conform to its peripheral contours.

In order to minimize or eliminate the cooling rate difference between the hot shaped glass sheet and the glass/support interface, the glass sheet supporting surface is composed of nonmetallic material having a low coefficient of thermal conductivity, such as glass ceramic composites or silica composites. Since the coefficient of thermal conductivity can be defined by the amount of heat in BTU's which will flow through a layer of material 1 square foot in area when the temperature difference between the surfaces of the layer is 1° F. per foot of thickness, it follows that as the coefficient of thermal conductivity decreases, the amount of heat transfer decreases. As a result, the material will retain its heat for a longer period of time. A material with a low coefficient of thermal conductivity will limit the heat transfer from the glass to the support member and thus reduce the cooling rate differential.

BRIEF DESCRIPTION OF THE DRAWINGS

FIG. 1 is a perspective view of a tempering ring incorporating features of the invention for handling a hot shaped glass sheet during tempering.

FIG. 2 is a fragmented view of the tempering ring illustrating the glass sheet supporting members and support rail.

FIG. 3 is a cross-sectional view, along lines 3—3 of FIG. 2 with portions removed for clarity and illustrating an edge portion of a glass sheet supported thereon.

FIG. 4 is a side view of the glass supporting member illustrated in FIG. 2.

FIG. 5 is a bottom view of the glass supporting members illustrated in FIG. 2.

FIG. 6 is a side view of the glass sheet support member in FIG. 2 prior to contacting a hot shaped glass sheet.

FIG. 7 is a side view of a glass sheet support member in FIG. 2 after pivoting to conform to the peripheral contour of a hot shaped glass sheet.

FIG. 8 is a view similar to that of FIG. 2 illustrating an alternate embodiment of a glass sheet supporting member.

FIG. 9 is a view similar to that of FIG. 2 illustrating an alternate embodiment of the tempering ring and glass supporting members.

FIG. 10 is a cross-sectional view taken along line 10—10 of FIG. 9 illustrating an edge portion of a glass sheet supported thereon.

FIG. 11 is a side view of a glass sheet supporting member illustrated in FIG. 9.

DETAILED DESCRIPTION OF THE INVENTION

FIG. 1 shows dual ring tempering ring 10, incorporating features of the invention, supported by carriage 12 in any convenient manner. For example, and not limited to the invention, the tempering ring 10 is reinforced by member 14 which encircles glass sheet support rail 16 and connected thereto by ring struts 18. The member 14 is connected to the carriage 12 by tempering ring supports 20 and carriage connector 22. The peripheral contours of glass sheet support rail 16 are generally similar the peripheral outline of the glass sheet (not shown) to be supported thereon. The glass sheet support rail 16 includes a continuous inner ring 24 and a continuous outer ring 26 held apart in a spaced relationship by hold-down plates 28. Although not limited to the invention, the rings 24 and 26 are preferably solid stainless steel bars with a square cross-section. Glass sheet support members 30 are pivotally mounted to an elevator 32 by pivoting means 34 (see FIGS. 2, 3, and 4) and are distributed along the perimeter of the glass sheet support rail 16.

The inner ring 24 has an outline and shape substantially similar to that of hot shaped glass sheet 36 at locations a short distance inboard of the sheet perimeter. Upper edge surface 38 of the inner ring 24 as viewed in FIG. 3 remains relatively horizontal. Outer ring 26 is located radially outward of the inner ring 24 a short distance outboard of the glass sheet 36 perimeter, with upper edge surface 40 of the outer ring 26 generally parallel to the upper edge surface 38 of the inner ring 24. Since the glass sheet support member 30 can pivot and orient itself to conform with the peripheral contour of the glass sheet 36, the upper edge surfaces 38 and 40 do not have to parallel these peripheral contours. It should be noted that although the preferred embodiment shows the rings 24 and 26 to be square in cross-section, the rings 24 and 26 can be any cross-section configuration, such as circular, as long as they are sufficiently rigid to support the glass sheet 36 during thermal treatment with minimal deformation.

With reference to FIGS. 2 through 5 and particularly to FIGS. 3 through 5, the hold-down plate 28 connects the inner ring 24 to the outer ring 26 and supports the glass sheet support member 30 for vertical adjustment by the elevator 32, in a manner to be discussed later. As illustrated in FIGS. 3 and 5, each hold-down plate 28 is connected to the rings 24 and 26 by threaded fasteners 42 and 44, respectively. Hole 46 in the plate 28 (see FIG. 3) is aligned with one of a plurality of holes 48 in lower surface 50 of the inner ring 24 and hole 52 of the plate 28 is aligned with one of a plurality of holes 54 in lower surface 56 of the outer ring 26 (see FIG. 5). When the fasteners 42 and 44 are inserted through the holes 46 and 52 and into the selected holes 48 and 54, the inner ring 24 is rigidly connected to the outer ring 26 and held apart a predetermined distance. This separation allows for additional air circulation during tempering. The holes 48 and 54 are spaced around the inner ring 24 and the outer ring 26, respectively, allowing longitudinal adjustment of the hold-down plates 28 by sliding the hold-down plates 28 along the perimeter of the glass sheet support rail 16.

The glass sheet support members 30 are distributed along the perimeter of the rings 24 and 26. As shown in FIGS. 3 and 4, the glass sheet support member 30 includes contact block 58 which is seated in and secured to, by any convenient method, channel 60, with its glass sheet supporting surface 62, extending above channel flanges 64 and 66. The channel 60 is located in a spaced relation above and bridges across the upper surfaces 38 and 40 of the rings 24 and 26, aligned with one of the hold-down plates 28 as shown in FIG. 3.

The elevator 32 includes threaded rod 68 which is pivotally attached to channel web 70 through the pivoting means 34. The threaded rod 68 extends between the rings 24 and 26, and through hole 72 in the hold-down plate 28. Nuts 74 and 76 are each threadedly engaged with the rod 68 about the hold-down plate 28 to capture the hold-down plate 28 therebetween. Loosening and tightening the nuts 74 and 76 secures the hold-down plate 28 therebetween and provides for fine vertical adjustments to the glass sheet support member 30.

Although not limited to the invention, the pivoting means 34 includes an apertured member 77 rigidly attached to upper end 79 of the threaded rod 68. In the preferred embodiment, the member 77 is a clevis member 78. Pivot plate 80, rigidly secured to the channel web 70, extends between ears 82 and 84 of the clevis member 78 and is captured therebetween by bolt assembly 86 which passes through aligned holes 88, 90 and 92 in the ears 82 and 84 and the pivot plate 80, respectively. The bolt assembly 86 is oriented parallel to the longitudinal direction of the rings 24 and 26 as illustrated in FIG. 2. Threaded bolt 94 of the bolt assembly 86 is secured by nut 96. It is obvious that the location of the clevis member 78 and pivot plate 80 can be reversed without affecting the operation of the pivoting means 34.

Pivoting means 34 allows the orientation of the glass sheet supporting surface 62 to be self adjusting as illustrated in FIGS. 6 and 7. The glass sheet support member 30 pivots about the bolt assembly 86 as the member 30 contacts the contoured peripheral edge of the glass sheet 36. It is preferred that the nut 94 be tightened sufficiently to maintain the same relative orientation of the glass sheet support members 30 and glass sheet supporting surface 62 after the glass sheet 36 has been removed but still allow some pivotal movement to account for any minor variations in edge contours of successive glass sheets. In the alternative, the nut 94 can be tightened to bind the clevis member 78 into firm engagement with the pivot plate 80 and lock the glass sheet support member 30 into a specific orientation based on the peripheral contours of the glass sheet 36.

FIG. 8 illustrates an alternate glass sheet support member 98 similar to that illustrated in FIGS. 1 through 5. The contact block 58 of the member 98 is bonded to contact block support plate 100 in any convenient manner wherein the contact block 58 of the glass support member 30 is secured in the channel 60.

Channel 60, plate 100, hold-down plate 28, fasteners 42 and 44, rod 68, nuts 74 and 76, and other assorted components, of support members 30 and 78 are preferably metal, e.g. stainless steel, but can be made of any material that is structurally stable during thermal treatment of glass. The contact block 58 is preferably a nonmetallic material, such as glass ceramic composites or silica composites, having a coefficient of thermal conductivity lower than that of the assorted components. In the preferred embodiment, the contact block 58 has a coefficient of thermal conductivity less than 2 BTU/hr/ft$^2$/°F./ft.

FIGS. 9 through 11 illustrate another embodiment of the tempering ring 10 with a glass sheet support member 102 which includes spacer member 104 and pivoting head member 106. The spacer member 104, having an open ended slot 108, fits between inner ring 110 and outer ring 112, secured therebetween by connection assembly 114. The rings 110 and 112 each have a series of holes 116 and 118, respectively, distributed around the perimeter of the rings 110 and 112 as shown in FIGS. 9 and 11 for longitudinal adjustment of said glass sheet support member 102. Adjusting bolt 120 of the connection assembly 114 passes through any of aligned sets of the holes 116 and 118 of the rings 110 and 112, respectively, and the slot 108 of the spacer member 104 and is secured therein by threaded nut 122.

The pivoting head member 106 of the glass sheet support member 102 includes contact block 124 which is seated in and secured to channel 126 with its glass sheet support surface 128 extending above channel flange 130 and 132. The glass sheet support surface 128 of contact block 124 supports the hot glass sheet 36 during tempering. The channel 126 of the head member 106 is located in a spaced relation above and spans across the rings 110 and 112.

Pivoting means 134 for the glass sheet support member 102 is similar to the pivoting means 34 associated with the glass sheet support member 30. Plate 136 mounted on the spacer member 104 is captured between plates 138 and 140 secured to channel 126, by bolt assembly 142. The pivoting head member 106 pivots about bolt 144 of the bolt assembly 142 which is secured by nut 146. The amount of pivotal freedom of the pivoting head member 106 depends on how tightly the bolt assembly 142 binds the plates 136, 138 and 140 together.

The longitudinal position of the glass sheet support members 102 can be adjusted by moving the spacer member 104 in a longitudinal direction between the rings 110 and 112 to any set of the aligned holes 116, 118. The vertical position of the glass sheet support member 102 can be adjusted by loosening the threaded nut 122 on the adjusting bolt 120, vertically sliding the member 102 relative to the rings and thereafter retightening the nut 122.

In its preferred embodiment the channel 126, pivoting means 134, and spacer means 104 are metal, e.g., stainless steel. The contact block 124 is of a material with a coefficient of thermal conductivity less than that of the channel member 126, pivoting means 134, and spacer means 104. In the preferred embodiment, the contact block 124 is a nonmetallic material with a coefficient of thermal conductivity less than 2 BTU/hr/ft$^2$/°F./ft, such as glass ceramic composites or silica composites.

As can now be appreciated variations become apparent to one of ordinary skill in the art. Accordingly, the invention is not to be limited to the specific embodiments illustrated and described herein and the true scope and spirit of the invention are to be determined by reference to the appended claims.

We claim:

1. Apparatus for supporting a hot shaped glass sheet of given size and outline during thermal treatment:
   a support rail means;
   a plurality of discrete glass sheet support members each having a glass sheet supporting surface;
   means for pivoting said glass sheet supporting surface;
   means for slidably mounting each of said support members for movement along the length of said support rail means; and
   means for detachably securing each of said support members at desired locations, in spaced relation to one another, along said support rail means wherein said glass sheet supporting surfaces of said support members define a peripheral contour similar to that of said hot shaped glass sheets to be supported thereon.

2. The apparatus as in claim 1 wherein said support rail includes at least one support ring generally conforming in outline and contour to the periphery of said shaped glass sheet.

3. The apparatus as in claim 2 wherein said support rail includes an inner ring having an inner ring upper edge surface conforming in outline and contour to the shape of said glass sheet and located a short distance inboard of the periphery of said glass sheet, an outer ring disposed radially outwardly of said inner ring, a short distance outboard of the periphery of said glass sheet, said outer ring having an outer ring upper edge surface conforming in outline and contour to the shape of said glass sheet with the upper surfaces of said inner and outer rings aligned with and generally paralleling one another and spacing means maintaining said rings a predetermined space apart.

4. The apparatus as in claim 3 wherein said individually mounting means includes means for longitudinal adjusting said glass sheet support members and means for vertical adjusting said glass sheet support members.

5. The apparatus as in claim 4 wherein said spacing means includes a plurality of hold-down plates spaced around the perimeter of said inner and outer rings, and means for securing said hold-down plates to lower edge surfaces of said rings to maintain the space therebetween.

6. The apparatus as in claim 5 wherein at least one of said glass sheet support members includes a contact block support plate positioned relative to said rings directly over one of said hold-down plates with a back face of said support plate facing and in a spaced relation above the upper edge surface of said rings, and wherein said glass sheet support surface is a surface of a contact block secured to said support plate.

7. The apparatus as in claim 6 wherein said hold-down plate has a hole facing the space between the rings and said vertical adjusting means includes a rod having a threaded portion, said rod having an upper portion pivotally connected to said back face of said support plate by said pivoting means and said threaded portion passing through said hole in said hold-down plate, and a pair of nuts mounted on each side of said hole in said hold-down plate and threaded on said threaded portion of said rod.

8. The apparatus as in claim 7 wherein said longitudinal adjusting means includes a plurality of holes in said lower edge surface of said rings for receiving fasteners, said fasteners securing portions of said hold-down plates to one of said inner and outer rings.

9. The apparatus as in claim 8 wherein said support plate has a coefficient of thermal conductivity and said contact block is composed of a material having a coefficient of thermal conductivity lower than the coefficient of thermal conductivity of said support plate.

10. An apparatus as in claim 9 wherein said contact block support plate is a channel member with upwardly facing flange members.

11. An apparatus as in claim 7 wherein said pivoting means includes at least one apertured pivot plate fixed to said back face of said support plate, at least one apertured plate fixed to said upper portion of said rod, and a bolt assembly passing through said pivot plate and said apertured plate, said bolt assembly oriented parallel to said rings.

12. The apparatus as in claim 4 wherein at least one of said glass sheet support members includes a head member pivotally connected to a spacer member by said pivoting means, said spacing means including said spacer member having an opening therein, a plurality of holes passing through each of said rings with one of said holes of said inner ring aligned with one of said holes in said outer ring, and a nut and bolt assembly sized to pass through a set of the aligned holes in said rings and the opening in said spacer member to urge the rings together against said spacer member to maintain the spacing between said rings and to prevent movement of said glass sheet support members in a longitudinal direction.

13. The apparatus as in claim 12 wherein said pivoting head member of said glass sheet support member is in a spaced relation above said rings and generally aligned with a set of the aligned holes in said rings.

14. The apparatus as in claim 13 wherein said vertical adjusting means includes said holes in said rings, said nut and bolt assembly, and said opening in said spacer member.

15. The apparatus as in claim 14 wherein said head member includes a contact block with a lower surface fixedly connected to a contact block support member of said head member, said contact block support member having a coefficient of thermal conductivity, said contact block having an upper surface being said glass sheet support surface and having a coefficient of thermal conductivity lower than the coefficient of thermal conductivity of said contact block support member.

16. The apparatus as in claim 14 wherein said inner and outer rails have a coefficient of thermal conductivity, and said pivoting head member has a coefficient of thermal conductivity lower than the coefficient of thermal conductivity of said rails, and further wherein said upper surface of said pivoting head member is said glass sheet support surface.

17. The apparatus as in claim 14 wherein said pivoting means includes at least one apertured pivot plate fixed to a lower face of said head member, at least one apertured plate fixed to an upper portion of said spacer member and bolt assembly passing through said pivot plate and said apertured plate, said bolt assembly oriented parallel to said rings.

* * * * *